April 3, 1956 L. W. HEIDERICH 2,740,224
LIVE BAIT PROTECTOR
Filed Sept. 23, 1952
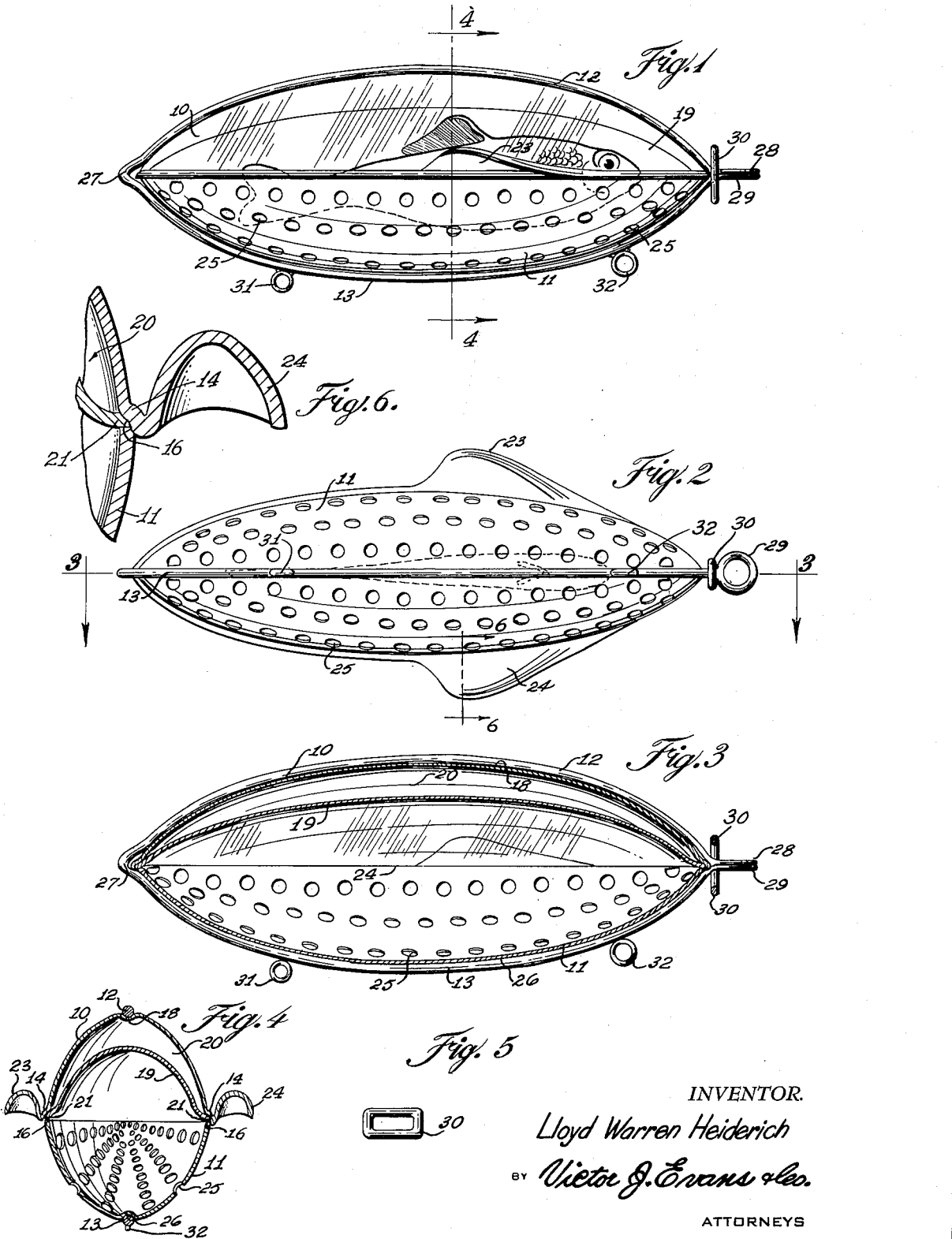
INVENTOR.
Lloyd Warren Heiderich
BY Victor J. Evans & Co.
ATTORNEYS United States Patent Office 2,740,224
Patented Apr. 3, 1956

2,740,224
LIVE BAIT PROTECTOR
Lloyd Warren Heiderich, St. Louis, Mo.
Application September 23, 1952, Serial No. 311,069
2 Claims. (Cl. 43—41)

This invention relates to fishing lures of the type using live bait and particularly where the live bait is positioned in a cage or transparent casing, and in particular this invention includes a lure having a minnow in a perforated shell with the shell provided with an air pocket to provide buoyancy and with the parts secured together with a wire clamp so that the minnow may readily be removed and replaced.

The purpose of this invention is to provide a live bait fishing lure in which water in which the lure is used flows through the lure continuously and also in which the bait is free to move in the lure.

Various types of fishing lures use live bait, however, where the bait is enclosed in a transparent water-tight casing the life of the bait is limited. With this thought in mind this invention contemplates a lure formed with a transparent casing for holding a minnow in which the casing is perforated and also in which the casing is provided with buoyant means.

An object of this invention is, therefore, to provide means for forming a fishing lure whereby live bait is enclosed in a transparent and perforated housing and in which an air chamber in the housing makes the lure buoyant.

Another object of the invention is to provide a transparent fishing lure in which live bait may be retained indefinitely, in which the bait may readily be removed and replaced.

A further object of the invention is to provide a perforated transparent shell for holding live bait to form a fishing lure in which the device is of a simple and economical construction.

With these and other objects and advantages in view the invention embodies an elongated elliptical shaped casing having upper and lower shell sections, each being substantially semi-circular in transverse cross section, with an air chamber in the upper section, with perforations in the lower section, and with the sections secured together with a wire clamp.

Other features and advantages of the invention will appear from the following description taken in connection with the drawing, wherein:

Figure 1 is a side elevational view illustrating the improved live minnow lure and showing a minnow therein.

Figure 2 is a view looking upwardly toward the under side of the lure.

Figure 3 is a longitudinal section through the lure taken on line 3—3 of Figure 2.

Figure 4 is a cross section through the lure taken on line 4—4 of Figure 1.

Figure 5 is a detail illustrating a ring for securing the parts of a lure in assembled relation.

Fig. 6 is an enlarged fragmentary portion of Fig. 4 taken substantially on the line 6—6 of Fig. 2 to more clearly illustrate the joint between the sections and the partitions.

Referring now to the drawing wherein like reference characters denote corresponding parts the improved live bait protector of this invention includes a hollow casing having an upper section 10, a lower section 11 and a wire clamp having an upper arm 12 and a lower arm 13.

The upper section 10 of the lure is substantially semi-circular in transverse cross section, as shown in Figure 4, and the edge is provided with a peripheral flange 14 with an arcuate shaped recess 16 in the under surface thereof. The upper part of the section 10 is provided with a continuous longitudinal groove 18 in which the upper arm 12 of the clamp is positioned.

The upper section 10 is also provided with an inner horizontal partition 19 which is spaced from the inner surface of the upper section to provide an air pocket 20 in the upper section of the lure whereby the lure is made buoyant. The partition 19 is provided with a rounded peripheral edge 21 that extends into the arcuate shaped recess 16 of the upper section 10 and is abutted by the peripheral edge portion of the lower section 11 within the recess 16 thus providing an air-tight joint between the parts as shown in Fig. 6. The sides of the upper section 10 are provided with depth fins 23 and 24 which are integral with the upper section and flare upwardly and outwardly from the forward end as shown in Fig. 6.

A lower section 11, which is also substantially semi-circular in transverse cross section is provided with perforations 25 and the lower part is provided with a continuous longitudinal groove 26 in which the lower arm 13 of the clamp is positioned.

The sections 10 and 11 are secured together with a clamp having an upper arm 12 and a lower arm 13 which fits snugly in the grooves 18 and 26 of the upper and lower sections 10 and 11, respectfully. The arms 12 and 13 are integrally joined together at one end of the lure by a U-shaped portion 27, and eyes 28 and 29 at the opposite end are secured together by a ring element 30 which is secured in position by a conventional snap fastener or clevis not shown on a fishing line, which is snapped through the eyes 28 and 29.

The lower arm 13 of the clamp is provided with hook mounting eyes 31 and 32.

With the parts formed in this manner the loop or ring element 30 is removed to open the arms 12 and 13 so that the sections 10 and 11 may be separated for removing and replacing a minnow and with the minnow positioned in the shell the upper and lower sections are clamped together with the wire clamp. The minnow is free to move about within the shell and fresh water passes through the openings 25 into the shell continuously.

It will be understood that modifications, within the scope of the appended claims may be made into the design and arrangement of the parts without departing from the spirit of the invention.

What is claimed is:

1. A fishing lure comprising elongated upper and lower shell sections each substantially semi-circular in transverse cross section, one of said sections having an outwardly extending peripheral flange thereon provided with an arcuate shaped recess in the lower surface thereof, a partition in said section having a rounded peripheral edge seated in said recess to provide an air chamber in said section, the other of said sections having perforations therethrough, and a clamp for securing the sections together to provide a housing for live bait.

2. In a fishing lure, the combination which comprises an elongated body including upper and lower shell sections, each of said sections being substantially semi-circular in transverse cross section, said body having an outwardly extending peripheral flange thereon provided with an arcuate shaped recess in the lower surface thereof, a partition in said body having a rounded peripheral edge seated in said recess to provide an air chamber in one of said sections, fins on said upper section integral therewith extending upwardly and outwardly of the body and the other of said sections having perforations extended therethrough, said sections having longitudinal grooves in the outer surfaces, a wire clamp having arcuate arms positioned in the grooves of the sections, one of said arms having hook mounting eyes thereon, and a ring for holding ends of the arms together.

References Cited in the file of this patent

UNITED STATES PATENTS

| | | |
|---|---|---|
| 573,572 | Dales | Dec. 22, 1896 |
| 1,870,273 | Willinger | Aug. 9, 1932 |
| 2,008,437 | De Witt | July 16, 1935 |
| 2,186,780 | De Witt | Jan. 9, 1940 |
| 2,302,206 | Gibson et al | Nov. 17, 1942 |
| 2,644,265 | Stettner | July 7, 1953 |

FOREIGN PATENTS

| | | |
|---|---|---|
| 487,609 | Great Britain | June 23, 1938 |